US005686814A

United States Patent [19]
Wierzbicki

[11] Patent Number: 5,686,814
[45] Date of Patent: Nov. 11, 1997

[54] BATTERY CIRCUIT FOR SUPPLYING POWER TO AN ELECTRONIC DEVICE

[75] Inventor: Robert P. Wierzbicki, Worcester, Mass.

[73] Assignee: Data General Corporation, Westboro, Mass.

[21] Appl. No.: 708,152

[22] Filed: Aug. 29, 1996

[51] Int. Cl.⁶ .................................................. H01M 10/46
[52] U.S. Cl. ............................ 320/15; 320/25; 320/56
[58] Field of Search ........................... 320/5, 9, 12, 15, 320/16, 25, 26, 30, 47, 56; 307/19, 44, 46, 48

[56] References Cited

U.S. PATENT DOCUMENTS

| 4,754,160 | 6/1988 | Ely ........................................ 307/64 |
| 5,172,045 | 12/1992 | Takeyasu .............................. 320/37 |
| 5,568,038 | 10/1996 | Tatsumi ................................ 320/14 |

Primary Examiner—Edward Tso
Attorney, Agent, or Firm—Kriegsman & Kriegsman

[57] ABSTRACT

A battery circuit for use in supplying power to an electronic device comprises a first battery source, a second battery source connected in parallel to the first battery source, a first auxiliary circuit for preventing the first battery source from being charged by the second battery source and for preventing a reverse voltage from being applied by the first battery source to the electronic device and a second auxiliary circuit for preventing the second battery source from being charged by the first battery source and for preventing a reverse voltage from being applied by the second battery source to the electronic device. The first auxiliary circuit includes a first MOSFET which has a first switching state and a second switching state and a first operational amplifier for controlling the switching state of the first MOSFET. The second auxiliary circuit is connected in series to the second battery source and includes a second MOSFET which has a first switching state and a second switching state and a second operational amplifier for controlling the switching state of the second MOSFET.

28 Claims, 1 Drawing Sheet

BATTERY CIRCUIT FOR SUPPLYING POWER TO AN ELECTRONIC DEVICE

BACKGROUND OF THE INVENTION

The present invention relates generally to battery circuits and more particularly to a battery circuit for supplying power to an electronic device.

Electronic devices, such as radios, tape recorders and hand held computers very often comprise a battery circuit for supplying power to the device.

The battery circuit very often includes a battery source in the form of two or more batteries connected in series. Configured as such, the output voltage of the batteries is the sum of the voltages of each individual battery, and the circuit current remains constant through each battery.

One drawback of a battery circuit which includes two or more batteries configured in series is that the power output is limited by the internal resistance of each battery. More specifically, the current capability of the battery circuit is limited to the internal resistance of the weakest battery in the power source. As a consequence, it has been often found that the current capacity of such a circuit is insufficient to drive higher power loads.

As a result, it is well known in the art for a battery circuit used to drive an electronic device to include a pair of battery sources connected in parallel, each battery source having one or more batteries connected in series. Configured as such, the current capacity of the circuit is dramatically increased. As a consequence, the increased current capacity increases the total power output of the circuit, thereby enabling the circuit to drive higher power loads.

However, it has been found that if the battery sources connected in parallel are of different strengths, the stronger battery in the circuit will try to charge up the weaker battery. This effect is undesirable because some battery power is consumed trying to charge the weaker battery rather than supplying power to the load, as is desired. In addition, if the batteries are not rechargeable, the weaker battery can become permanently damaged.

It has also been found that if one or more of the batteries in a battery source are inserted incorrectly (i.e. backwards), the electronic device may become damaged. Specifically, the reverse voltage being applied by the battery (or batteries) inserted incorrectly can permanently damage integrated circuits which may be within the electronic device.

To remedy these effects, a pair of oppositely biased diodes are often coupled to the battery circuit. If there is a substantial voltage differential between the batteries in parallel, the voltage drop across the diodes will cause one of the diodes to switch into the open position, thereby preventing current from passing from the stronger battery to the weaker battery. Because the circuit includes a second diode which is oppositely biased, the circuit is protected regardless of which battery is stronger than the other. Also, if the batteries are inserted incorrectly, the pair of diodes serve to prevent a reverse voltage from being applied to the electronic device.

In such a battery circuit, the use of Schottky type diodes is desirable because Schottky diodes characteristically have a low forward voltage drop. This is desirable because as little voltage as possible should be consumed across the diode instead of the load.

However, regardless of the type of diode used in the battery circuit, it has been found that when the battery circuit is used to supply power to large power loads, i.e., loads which fall into the upper load range rating for the battery being used, such as laser instruments, the voltage drop across the diodes is so large that a significant amount of the battery source power is "dropped" across the diodes as wasted heat.

It is an object of this invention to provide a new and improved battery circuit.

It is another object of this invention to provide a battery circuit as described above which comprises a pair of battery sources connected in parallel.

It is yet another object of this invention to provide a battery circuit as described above which prevents one battery source from charging the other battery source.

It is still another object of this invention to provide a battery circuit as described above which has components simulating a pair of diodes for preventing one battery source from charging the other battery source but which does not have as high a voltage drop as associated with diodes.

It is a further object of this invention to provide a battery circuit as described above which supplies more power to an electronic device than would otherwise normally occur using a pair of oppositely biased diodes as has been done in the past.

It is yet another object of this invention to provide a battery circuit as described above which protects the electronic device from damage caused by the incorrect positioning of the batteries.

SUMMARY OF THE INVENTION

A battery circuit for use in supplying power to an electronic device constructed according to this invention comprises a first battery source, a second battery source connected in parallel to said first battery source, and a first auxiliary circuit connected to said first battery source, said first auxiliary circuit comprising a first switching device and a first switch controlling device, said first switching device having a first switching state and a second switching state, said first switching state allowing current to flow to said first battery source from said second battery source and said second switching state preventing current from flowing to said first battery source from said second battery source, said first switch controlling device controlling the switching state of said first switching device.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
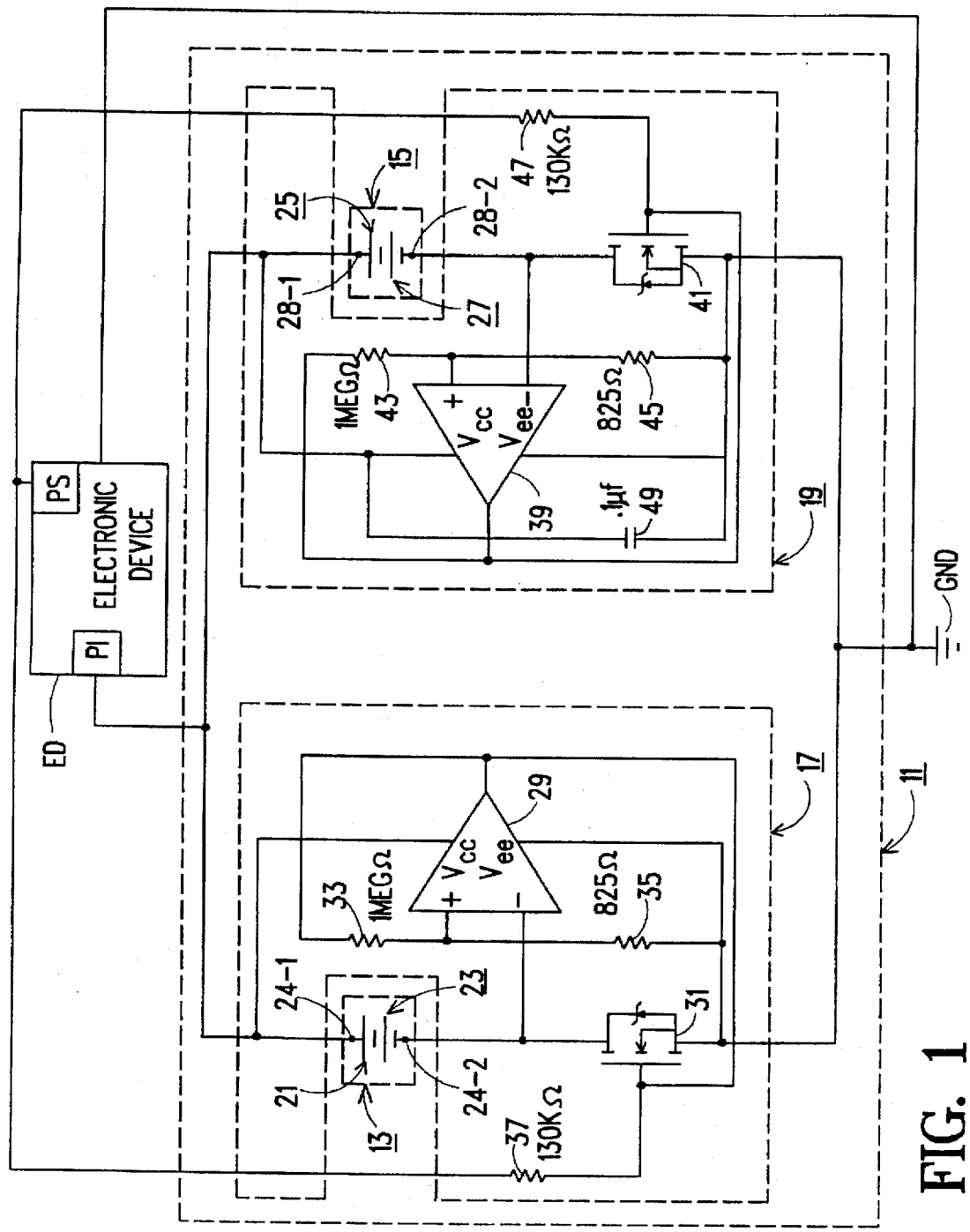
FIG. 1 is a schematic representation of an electronic device and a battery circuit constructed according to the teachings of the present invention for supplying power to the electronic device, the electronic device being shown in block diagram form.

Referring now to the drawings, there is shown in FIG. 1 a schematic representation of an electronic device ED and a battery circuit constructed according to the teachings of the present invention for supplying power to electronic device ED, the circuit being identified by reference numeral 11 and electronic device ED being shown in block diagram form.

Circuit 11 comprises a first battery source 13, a second battery source 15 connected in parallel to first battery source 13, a first auxiliary circuit 17 and a second auxiliary circuit 19.

First battery source 13 comprises a pair of 1.5 volt batteries 21 and 23 connected in series and includes a positive terminal 24-1 and a negative terminal 24-2. Second battery source 15 similarly comprises a pair of 1.5 volt batteries 25 and 27 connected in series and includes a positive terminal 28-1 and a negative terminal 28-2. It is preferred that first battery source 13 and second battery source 15 have equal output voltages, as will be discussed in detail below. Batteries 21, 23, 25 and 27 may be, for example, 1.5 volt, size AA, Duracell non-rechargeable batteries.

First auxiliary circuit 17 is connected to terminals 24-1 and 24-2 in first battery source 13. First auxiliary circuit 17 prevents first battery source 13 from being charged by second battery source 15 and in addition, as will hereinafter be explained, first auxiliary circuit 17 prevents a reverse voltage from being applied to electronic device ED.

First auxiliary circuit 17 comprises an operational amplifier (op amp) 29 which serves as a switch controlling device, a metal-oxide-semiconductor field-effect transistor (MOSFET) 31 having an N-type channel which serves as a switching device, a pair of bias resistors 33 and 35, and a driving resistor 37. MOSFET 31 has first and second switching states which are controlled by op amp 29. MOSFET 31 may be, for example a Siemens N-channel SIPMOS Transistor/FET, model BSP-295.

Positive terminal 24-1 of battery source 13 is connected to the collector terminal Vcc of op amp 29 and to a power input PI in electronic device ED. The negative terminal of battery 23 is connected to the drain of MOSFET 31 and to the inverting input of op amp 29. The source of MOSFET 31 is connected to the emitter terminal Vee of op amp 29 and to a ground GND. Bias resistor 35 is connected to the source of MOSFET 31 and to the noninverting input of op amp 29. Bias resistor 33 is connected to the noninverting input of op amp 29 and to the output of op amp 29. The output of op amp 29 is connected to the gate of MOSFET 31. Driving resistor 37 is connected to the gate of MOSFET 31 and to a 5 volt power supply PS contained within electronic device ED, electronic device ED being connected to ground GND.

Second auxiliary circuit 19 is connected in series to second battery source 15. Second auxiliary circuit 19 prevents second battery source 15 from being charged by first battery source 13 and also prevents a reverse voltage from being applied to electronic device ED.

Second auxiliary circuit 19 is similar in construction to first auxiliary circuit 17. Specifically, second auxiliary circuit 19 comprises an op amp 39, a MOSFET 41 having an N-type channel, a pair of bias resistors 43 and 45, and a driving resistor 47. Second auxiliary circuit 19 further includes a capacitor 49 for decoupling noise produced by circuit 11. Op amps 29 and 39 may be contained within a single Linear Tech Corporation integrated circuit, model no. LT1017.

Positive terminal 28-1 of battery 25 is connected to the collector terminal Vcc of op amp 39 and to power input PI in electronic device ED. The negative terminal 28-2 of battery 27 is connected to the drain of MOSFET 41 and to the inverting input of op amp 39. The source of MOSFET 41 is connected to the emitter terminal Vee of op amp 39 and to ground GND. Bias resistor 45 is connected to the source of MOSFET 41 and to the noninverting input of op amp 39. Bias resistor 43 is connected to the noninverting input of op amp 39 and to the output of op amp 39. The output of op amp 39 is connected to the gate of MOSFET 41. Driving resistor 47 is connected to the gate of MOSFET 41 and to power supply PS. Capacitor 49 is connected to the collector terminal of op amp 39 and to the emitter terminal of op amp 39.

In use, first and second battery sources 13 and 15 together supply the power required to drive electronic device ED. Due to the parallel configuration of battery sources 13 and 15, if one battery source has a higher output voltage than the other battery source, the higher output voltage battery source will attempt to charge the lower output voltage battery source, which is undesirable. Auxiliary circuits 17 and 19 serve to prevent one battery source from charging another battery source. In addition, auxiliary circuits 17 and 19 function without creating a large forward voltage drop. The function of auxiliary circuits 17 and 19 varies according to the output voltage as well as the placement of each battery source, as will be discussed in detail below.

When battery sources 13 and 15 are positioned correctly within circuit 11 and have equal output voltages, the positive voltage drop across each MOSFET will forward bias its respective MOSFET into a first switching state. In the first switching state, there exists a low ohm state with a forward voltage drop of about 300 millivolts typically across the intrinsic diode in each MOSFET. The low ohm state across each MOSFET enables current to pass across each MOSFET from its drain to its source.

Furthermore, the positive voltage drop of each battery source produces a value at the inverting input of each op amp which is less than the value at the noninverting input of each op amp. This creates a high value at the output of the op amp, which further drives each MOSFET to the first switching state, thereby increasing the capability for current to pass from the drain to the source and lowering the forward voltage drop to about 10 millivolts typically.

In addition, driving resistors 37 and 47 also serve to drive MOSFETs 31 and 41, respectively, to the first switching state, further increasing the capability for current to pass from the drain to the source. It should be noted that driving resistors 37 and 47 are required in circuit 11 as an additional driving means because of the particular MOSFETs selected. If MOSFETs 31 and 41 were replaced with a single Siliconix integrated circuit, model no. Si6946DQ, which contains dual N-channel MOSFETs, driving resistors 37 and 47 would not be required in circuit 11 and therefore could be eliminated.

With circuit 11 functioning in this manner, current can pass freely from one battery source to another. However, there is no risk of one battery source charging the other battery source because, as stated initially, the two battery sources have equal output voltages and all current will flow to electronic device ED.

On occasion, a battery source may be incorrectly positioned in circuit 11. For example, one or more batteries in the battery source may be positioned backwards in circuit 11 so that the negative battery terminal is positioned where the positive battery terminal should be. In this circumstance, circuit 11 acts in the following manner. Placing a battery source in backwards causes a reverse bias across the intrinsic diode of the MOSFET of the auxiliary circuit which complements the battery source (e.g., first auxiliary circuit 17 complements battery source 13 and second auxiliary circuit 19 complements battery source 15). The reverse bias across the intrinsic diode of the MOSFET drives the MOSFET to a second switching state in which current is incapable of passing across the MOSFET from the drain to the source.

Furthermore, the reversed positioning of the battery source in the circuit inverses the values which are input in the op amp. Specifically, the battery source produces a value at the inverting input of its complementary op amp which is greater than the value at the noninverting input of the op amp. This creates a low value at the output of the op amp, which continues to drive the MOSFET to the second switching state. As a result, current is not capable of passing from a properly positioned battery source to the incorrectly positioned battery source for charging purposes. As an additional result, the incorrectly positioned battery source does not apply a reverse voltage across electronic device ED. This is significant because a reverse voltage across electronic device ED can permanently damage integrated circuits in electronic device ED.

When one battery source produces a higher output voltage than another battery source, circuit 11 acts in the following manner. Because the battery sources are connected in parallel at the positive terminals, negative terminal of the battery source having the lower voltage output will have a higher voltage than ground GND. This condition effects the auxiliary circuit complementing the weaker battery source by producing a value at the inverting input of the op amp which is higher than the value at the noninverting input of the op amp. This results in a low op amp output. The low op amp output will reverse bias the MOSFET, driving the MOSFET into a second switching state in which current is incapable from passing across the MOSFET from the drain to the source. In addition, because the current path across the MOSFET is opposite the orientation of its intrinsic diode, the MOSFET will not conduct. As a result, current is not capable of passing from the stronger battery source to the weaker battery source for charging purposes.

It should be noted that current will not pass from the stronger battery source to the weaker battery source unless the two battery sources produce the same output voltage (with an approximate 5 millivolt differential allowed). Because the electronic device ED always draws some current from battery circuit 11, even if electronic device ED draws only a few microamps, device ED prevents a cross charge from occurring between two battery sources which have output voltages differing by only a few millivolts. To prevent the MOSFET from turning on and off at a rapid rate, which would draw current and consume battery source power, the circuit includes bias resistors 33, 35, 43 and 45. Bias resistors 33, 35, 43 and 45 act to create hysteresis for the op amps, thereby limiting the amount of cycling between battery sources of different strengths. Bias resistors 33 and 43 have a value of 1 Megaohm and bias resistors 35 and 45 have a value of 825 ohms in order to create the 5 millivolt level of hysteresis.

As can be appreciated, auxiliary circuits 17 and 19 simulate the function of diodes in the battery circuit in which they are employed but do not have as high a voltage drop as diodes when used with loads requiring a large amount of power, such as a laser scanner.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A battery circuit for use in supplying power to an electronic device, said battery circuit comprising:
   (a). a first battery source having a positive terminal and a negative terminal,
   (b). a second battery source connected in parallel to said first battery source, said second battery source having a positive terminal and a negative terminal, and
   (c). a first auxiliary circuit connected to said first battery source, said first auxiliary circuit comprising,
      (i). a first switching device having a first switching state and a second switching state, said first switching state allowing current to flow to said first battery source from said second battery source and said second switching state preventing current from flowing to said first battery source from said second battery source, and
      (ii). a first switch controlling device for controlling the switching state of said first switching device, said first switch controlling device placing said first switching device in its second switching state when the voltage of said first battery source is less than the voltage of said second battery source so as to prevent all cross-charging of said first battery source by said second battery source.

2. The battery circuit as claimed in claim 1 wherein said first switching device is a transistor.

3. The battery circuit as claimed in claim 1 further comprising a second auxiliary circuit connected to said second battery source, said second auxiliary circuit comprising,
   (i). a second switching device having a first switching state and a second switching state, said first switching state allowing current to flow to said second battery source from said first battery source and said second switching state preventing current from flowing to said second battery source from said first battery source, and
   (ii). a second switch controlling device for controlling the switching state of said second switching device, said second switch controlling device placing said second switching device in its second switching state when the voltage of said second battery source is less than the voltage of said first battery source so as to prevent all cross-charging of said second battery source by said first battery source.

4. The battery circuit as claimed in claim 3 wherein said second switching device is a transistor.

5. The battery circuit as claimed in claim 4 wherein said second switch controlling device is an operational amplifier.

6. The battery circuit as claimed in claim 5 wherein said second transistor is a metal-oxide-semiconductor field-effect transistor (MOSFET) having an N-type channel and including a drain, a gate and a source.

7. The battery circuit as claimed in claim 1 wherein each battery source comprises two batteries.

8. The battery circuit as claimed in claim 7 wherein each battery is 1.5 volts.

9. A circuit connected to a first battery source for controlling the flow of current to the first battery source from a second battery source, the second battery source being connected in parallel with the first battery source, said circuit comprising:
   (i). a switching device having a first switching state and a second switching state, said first switching state allowing current to flow to said first battery source from said second battery source and said second switching state preventing current from flowing to said first battery source from said second battery source, and (ii). a switch controlling device for controlling the switching state of said switching device, said switch controlling device placing said switching device in its second switching state when the voltage of said first battery source is less than the voltage of said second battery source so as to prevent all cross-charging of said first battery source by said second battery source.

10. The circuit of claim 9 wherein said switching device is a transistor.

11. A battery circuit for use in supplying power to an electronic device, said battery circuit comprising:

(a). a first battery source having a positive terminal and a negative terminal, (b). a second battery source connected in parallel to said first battery source, said second battery source having a positive terminal and a negative terminal, (c). a first auxiliary circuit connected to said first battery source, said first auxiliary circuit comprising, (i). a first transistor having a first switching state and a second switching state, said first switching state allowing current to flow to said first battery source from said second battery source and said second switching state preventing current from flowing to said first battery source from said second battery source, said first transistor being a metal-oxide-semiconductor field-effect transistor (MOSFET) having an N-type channel and including a drain, a gate and a source, and (ii). a first operational amplifier for controlling the switching state of said first transistor, said first operational amplifier having an inverting input, a noninverting input, an output, a collector terminal and an emitter terminal, (iii). wherein the positive terminal of said first battery source is coupled to the collector terminal of said first operational amplifier and to the electronic device, the negative terminal of said first battery source is coupled to the inverting input of said first operational amplifier and to the drain of said first transistor, the emitter terminal of said first operational amplifier is coupled to the noninverting input of said first operational amplifier and to the source of said first transistor, the noninverting input of said first operational amplifier is coupled to the output of said first operational amplifier and to the source of said first transistor, the output of said first operational amplifier is coupled to the gate of said first transistor, and the source of said first transistor is coupled to a ground, and (d). a second auxiliary circuit connected to said second battery source, said second auxiliary circuit comprising, (i). a second transistor having a first switching state and a second switching state, said first switching state allowing current to flow to said second battery source from said first battery source and said second switching state preventing current from flowing to said second battery source from said first battery source, said first transistor being a metal-oxide-semiconductor field-effect transistor (MOSFET) having an N-type channel and including a drain, a gate and a source, and (ii). a first operational amplifier for controlling the switching state of said second transistor.

12. The battery circuit as claimed in claim 11 wherein said second operational amplifier includes an inverting input, a noninverting input, an output, a collector terminal and an emitter terminal, the positive terminal of said second battery source being coupled to the collector terminal of said second operational amplifier and to the electronic device, the negative terminal of said second battery source being coupled to the inverting input of said second operational amplifier and to the drain of said second transistor, the emitter terminal of said second operational amplifier being coupled to the noninverting input of said second operational amplifier and to the source of said second transistor, the noninverting input of said second operational amplifier being coupled to the output of said second operational amplifier and to the source of said second transistor, the output of said second operational amplifier being coupled to the gate of said second transistor, and the source of said second transistor being coupled to a ground.

13. The battery circuit as claimed in claim 12 wherein said first auxiliary circuit further includes first and second resistors for biasing the battery circuit, said first resistor being coupled to the noninverting input of said first operational amplifier and to the output of said first operational amplifier, and said second resistor being coupled to the noninverting input of said first operational amplifier and to the source of said first transistor.

14. The battery circuit as claimed in claim 13 wherein said second auxiliary circuit further includes third and fourth resistors for biasing the battery circuit, said third resistor being coupled to the noninverting input of said second operational amplifier and to the output of said second operational amplifier, and said fourth resistor being coupled to the noninverting input of said second operational amplifier and to the source of said second transistor.

15. The battery circuit as claimed in claim 14 wherein said second auxiliary circuit further includes a capacitor for decoupling noise produced by said battery circuit, said capacitor being coupled to the collector terminal of said second operational amplifier and to the emitter terminal of said second operational amplifier.

16. The battery circuit as claimed in claim 15 further resistor for assisting and a fifth resistor for assisting to control the switching state of said first transistor, said fifth resistor being coupled to said power supply and to the gate of said first transistor.

17. The battery circuit as claimed in claim 16 further comprising a sixth resistor for assisting to control the switching state of said second transistor, said sixth resistor being coupled to said power supply and to the gate of said second transistor.

18. A battery circuit for use in supplying power to an electronic device, said battery circuit comprising:

(a). a first battery source having a positive terminal and a negative terminal, (b). a second battery source connected in parallel to said first battery source, said second battery source having a positive terminal and a negative terminal, and (c). a first auxiliary circuit connected to said first battery source, said first auxiliary circuit comprising, (i). a transistor having a first switching state and a second switching state, said first switching state allowing current to flow to said first battery source from said second battery source and said second switching state preventing current from flowing to said first battery source from said second battery source, and (ii). an operational amplifier for controlling the switching state of said transistor.

19. The battery circuit as claimed in claim 18 wherein said first transistor is a metal-oxide-semiconductor field-effect transistor (MOSFET) having an N-type channel and including a drain, a gate and a source.

20. The battery circuit as claimed in claim 19 wherein said first operational amplifier includes an inverting input, a noninverting input, an output, a collector terminal and an emitter terminal, the positive terminal of said first battery source being coupled to the collector terminal of said first operational amplifier and to the electronic device, the negative terminal of said first battery source being coupled to the inverting input of said first operational amplifier and to the drain of said first transistor, the emitter terminal of said first operational amplifier being coupled to the noninverting input of said first operational amplifier and to the source of said first transistor, the noninverting input of said first operational amplifier being coupled to the output of said first operational amplifier and to the source of said first transistor, the output of said first operational amplifier being coupled to the gate of said first transistor, and the source of said first transistor being coupled to a ground.

21. A battery circuit for use in supplying power to an electronic device, said battery circuit comprising:
  (a). a first battery source having a positive terminal and a negative terminal,
  (b). a second battery source connected in parallel to said first battery source, said second battery source having a positive terminal and a negative terminal,
  (c). a first auxiliary circuit connected to said first battery source, said first auxiliary circuit comprising,
    (i). a first transistor having a first switching state and a second switching state, said first switching state allowing current to flow to said first battery source from said second battery source and said second switching state preventing current from flowing to said first battery source from said second battery source, said first transistor being a metal-oxide-semiconductor field-effect transistor (MOSFET) having an N-type channel and including a drain, a gate and a source, and
    (ii). a first operational amplifier for controlling the switching state of said first transistor, and
  (d). a second auxiliary circuit connected to said second battery source, said second auxiliary circuit comprising,
    (i). a second transistor having a first switching state and a second switching state, said first switching state allowing current to flow to said second battery source from said first battery source and said second switching state preventing current from flowing to said second battery source from said first battery source, said first transistor being a metal-oxide-semiconductor field-effect transistor (MOSFET) having an N-type channel and including a drain, a gate and a source, and
    (ii). a second operational amplifier for controlling the switching state of said second transistor, said second operational amplifier having an inverting input, a noninverting input, an output, a collector terminal and an emitter terminal,
    (iii). wherein the positive terminal of said second battery source is coupled to the collector terminal of said second operational amplifier and to the electronic device, the negative terminal of said second battery source is coupled to the inverting input of said second operational amplifier and to the drain of said second transistor, the emitter terminal of said second operational amplifier is coupled to the noninverting input of said second operational amplifier and to the source of said second transistor, the noninverting input of said second operational amplifier is coupled to the output of said second operational amplifier and to the source of said second transistor, the output of said second operational amplifier is coupled to the gate of said second transistor, and the source of said second transistor is coupled to a ground.

22. The battery circuit as claimed in claim 20 wherein said first auxiliary circuit further includes first and second resistors for biasing the battery circuit, said first resistor being coupled to the noninverting input of said first operational amplifier and to the output of said first operational amplifier, and said second resistor being coupled to the noninverting input of said first operational amplifier and to the source of said first transistor.

23. The battery circuit as claimed in claim 21 wherein said second auxiliary circuit further includes third and fourth resistors for biasing the battery circuit, said third resistor being coupled to the noninverting input of said second operational amplifier and to the output of said second operational amplifier, and said fourth resistor being coupled to the noninverting input of said second operational amplifier and to the source of said second transistor.

24. The battery circuit as claimed in claim 23 wherein said second auxiliary circuit further includes a capacitor for decoupling noise produced by said battery circuit, said capacitor being coupled to the collector terminal of said second operational amplifier and to the emitter terminal of said second operational amplifier.

25. The battery circuit as claimed in claim 22 further comprising a power supply and a fifth resistor for assisting to control the switching state of said first transistor, said fifth resistor being coupled to said power supply and to the gate of said first transistor.

26. The battery circuit as claimed in claim 24 further comprising a sixth resistor for assisting to control the switching state of said second transistor, said sixth resistor being coupled to said power supply and to the gate of said second transistor.

27. An auxiliary circuit comprising:
  (i). a transistor having a first switching state and a second switching state, said first switching state allowing current to flow to said first battery source from said second battery source and said second switching state preventing current from flowing to said first battery source from said second battery source, and
  (ii). a operational amplifier for controlling the switching state of said transistor.

28. The auxiliary circuit of claim 27 wherein said transistor is a metal-oxide-semiconductor field-effect transistor (MOSFET) having an N-type channel.

* * * * *